(12) United States Patent
Hiemeyer et al.

(10) Patent No.: US 10,247,468 B2
(45) Date of Patent: Apr. 2, 2019

(54) VACUUM INSULATION BODY

(71) Applicants: LIEBHERR-HAUSGERATE LIENZ GMBH, Lienz (AT); LIEBHERR-HAUSGERATE OCHSENHAUSEN GMBH, Ochsenhausen (DE)

(72) Inventors: Jochen Hiemeyer, Karlstadt (DE); Michael Freitag, Wurzburg (DE); Martin Kerstner, Wurzburg (DE)

(73) Assignees: LIEBHERR-HAUSERÄTE LIENZ GMBH, Lienz (AT); LIEBHERR-HAUSERÄTE OCHSENHAUSEN GMBH, Ochsenhause (DE)

( * ) Notice: Subject to any disclaimer, the term of this patent is extended or adjusted under 35 U.S.C. 154(b) by 0 days.

(21) Appl. No.: 15/529,520

(22) PCT Filed: Oct. 23, 2015

(86) PCT No.: PCT/EP2015/002109
§ 371 (c)(1),
(2) Date: May 25, 2017

(87) PCT Pub. No.: WO2016/082907
PCT Pub. Date: Jun. 2, 2016

(65) Prior Publication Data
US 2017/0321956 A1 Nov. 9, 2017

(30) Foreign Application Priority Data

Nov. 27, 2014 (DE) .................. 10 2014 017 597
Dec. 19, 2014 (DE) .................. 10 2014 019 234
Jun. 24, 2015 (DE) .................. 10 2015 008 157

(51) Int. Cl.
*F16L 59/065* (2006.01)
*F25D 23/06* (2006.01)

(52) U.S. Cl.
CPC .......... *F25D 23/066* (2013.01); *F16L 59/065* (2013.01); *F25D 23/062* (2013.01); *F25D 2201/14* (2013.01); *Y10T 428/231* (2015.01)

(58) Field of Classification Search
CPC ..... Y10T 428/231; F16L 59/065; E04B 1/803
See application file for complete search history.

(56) References Cited

U.S. PATENT DOCUMENTS 9,400,133 B2 * 7/2016 Miyaji ................ F16L 59/065
2012/0009376 A1 1/2012 Rusek, Jr.
(Continued)

FOREIGN PATENT DOCUMENTS

CN 1404442 A 3/2003
CN 1853922 A 11/2006
(Continued)

OTHER PUBLICATIONS

International Search Report and Written Opinion issued in corresponding International Patent Application No. PCT/EP2015/002109 (with English translation of International Search Report) dated Jan. 27, 2016 (16 pages).
(Continued)

*Primary Examiner* — Alexander S Thomas
(74) *Attorney, Agent, or Firm* — Kilyk & Bowersox, P.L.L.C.

(57) ABSTRACT

The present invention relates to a vacuum insulation body comprising a vacuum-tight casing which surrounds an evacuated region, wherein a core material is arranged in the evacuated region, wherein the casing includes an opening for filling the casing with the core material, which is covered by a vacuum-tight cover film, wherein the casing is folded (Continued)

Figure 1:
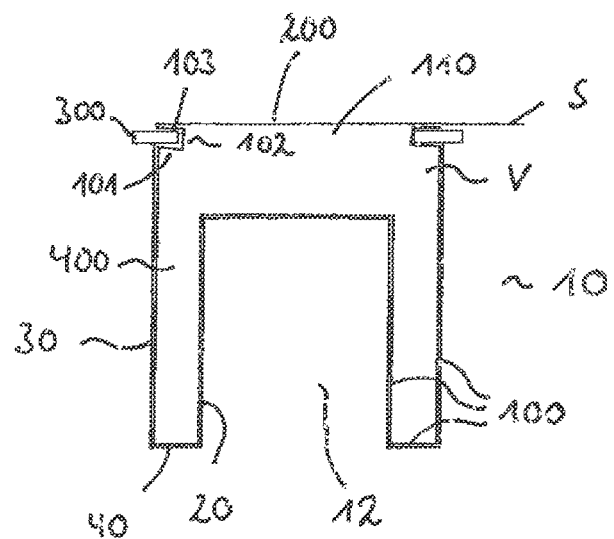

inwards in the edge region protruding towards the opening, so that the opening is reduced in size, and subsequently again is folded outwards, wherein the region folded outwards and a region of the cover film are vacuum-tightly connected with each other all around.

9 Claims, 1 Drawing Sheet

(56) References Cited

U.S. PATENT DOCUMENTS

| | | | |
|---|---|---|---|
| 2015/0377545 | A1 | 12/2015 | Freitag et al. |
| 2015/0377546 | A1 | 12/2015 | Freitag et al. |

FOREIGN PATENT DOCUMENTS

| | | |
|---|---|---|
| CN | 102635171 B | 6/2014 |
| DE | 102010040346 A1 | 3/2012 |
| DE | 102010040557 A1 | 3/2012 |
| DE | 102013002312 A1 | 8/2014 |
| DE | 102013005585 A1 | 8/2014 |
| EP | 0263511 A2 | 4/1988 |
| WO | 2004010042 A1 | 1/2004 |

OTHER PUBLICATIONS

Search Report issued in corresponding German Patent Application No. 10 2015 008 157.8 dated Sep. 21, 2015 (10 pages).

Lahousse, S.W., "Vacuum Insulation Using Perlite Powder Sealed in Plastic and Glass," Department of Mechanical Engineering, Massachusetts Institute of Technology, Mar. 24, 1993, XP055240992, retrieved from the Internet: URL:http://dspace.mit.edu/bitstream/handle/1721.1/72769/29813396-MIT.pdf?sequence=2, 70 pages.

Office Action received in corresponding Chinese Patent Application No. 201580064252.3 dated Nov. 1, 2018 (in Chinese) (9 pages).

\* cited by examiner

VACUUM INSULATION BODY

This application is a National Stage Application of PCT/EP2015/002109, filed Oct. 23, 2015, which claims priority to German Patent Application No. 10 2014 017 597.9, filed Nov. 27, 2014, German Patent Application No. 10 2014 019 234.2, filed Dec. 19, 2014, and German Patent Application No. 10 2015 008 157.8, filed Jun. 24, 2015, which are incorporated in their entireties by reference herein.

The present invention relates to a vacuum insulation body comprising a vacuum-tight casing which surrounds an evacuated region, wherein a core material, such as pearlite, is arranged in the evacuated region.

Such vacuum insulation body is known for example from DE 10 2013 005 585 A1. The vacuum insulation body known from this patent application consists of a diffusion-tight, i.e. vacuum-tight casing whose surface area is larger than the surface area of the enveloping body, such as for example of an inner container against which the casing rests. It hence is possible, for example, that protruding or set-back contours of the enveloping body are reproduced in the casing.

During the manufacture of a vacuum insulation body a packing preferably is incorporated into the casing. To be able to expediently perform the incorporation of the packing, an opening is provided in the casing, which after filling must be closed in a vacuum-tight way.

This vacuum-tight sealing is problematic in so far as the opening of the casing does not have a defined surface for mounting or placing a cover film that covers the opening.

It therefore is the object underlying the present invention to develop a vacuum insulation body as mentioned above to the effect that closing or sealing of the opening of the casing can safely be carried out.

This object is solved by a vacuum insulation body with the features of a first embodiment that is a vacuum insulation body comprising a vacuum-tight casing which surrounds an evacuated region, wherein a core material is arranged in the evacuated region, characterized in that the casing includes an opening for filling the casing with the core material, which is covered by a vacuum-tight cover film, wherein the casing is folded inwards in the edge region protruding towards the opening, so that the opening is reduced in size, and subsequently again is folded outwards, wherein the region folded to the outside and a region of the cover film are vacuum-tightly connected with each other all around. Accordingly, it is provided that the casing includes an opening covered by a vacuum-tight cover film, which serves for filling the casing with the core material, wherein the casing initially is folded inwards in the edge region protruding towards the opening, so that the opening is reduced in size, and subsequently again is folded outwards, wherein the region folded outwards as well as a region of the cover film are vacuum-tightly connected with each other all around. Due to the special kind of folding the edge region of the opening of the casing, a sealing surface of the casing is created, which can safely and vacuum-tightly be connected or sealed with the cover film.

The present invention furthermore relates to a vacuum insulation body with the features of a second embodiment that is a vacuum insulation body comprising a vacuum-tight casing which surrounds an evacuated region, wherein a core material is arranged in the evacuated region, characterized in that the casing includes an opening for filling the casing with the core material, which is covered by a vacuum-tight cover film, wherein in the edge region protruding towards the opening the casing is provided with an auxiliary structure on which the edge region rests such that the edge region forms a flat surface, and wherein the edge region with its flat surface and a region of the cover film are vacuum-tightly connected with each other all around. Accordingly, it is provided that the casing includes an opening covered by a vacuum-tight cover film for filling the casing with the core material, wherein in the edge region protruding towards the opening the casing is provided with an auxiliary structure on which the edge region rests such that the same forms a flat surface, and wherein the edge region with its flat surface as well as a region of the cover film are vacuum-tightly connected with each other all around. In this case, an auxiliary structure is used in the region of the opening of the casing to provide a flat sealing surface of the casing. On this auxiliary structure the edge region of the casing rests such that it forms a flat surface which forms the counter surface for the cover film with which the casing is sealed in a vacuum-tight way.

A combination of the two embodiments of the invention according to the first embodiment and the second embodiment also is conceivable and comprised by the invention. For example, the region folded outwards can form the flat surface which rests against or on top of the auxiliary structure. Preferably, the region folded outwards or the flat surface forms the outer surface of the casing in the region of the opening, on which the cover film then can be applied.

Due to the further contour or auxiliary contour, which in the following also is referred to as auxiliary structure, in the preferably oversized film envelope or casing, an end of the opening of the vacuum insulation body or of its casing is formed, which forms a preferably flat sealing possibility for another flat film piece in the form of the cover film.

To avoid soiling of the future sealing seam between the casing and the cover film as far as possible, it can be expedient to fill the casing with the core material only to a point below the auxiliary structure or below the edge region of the casing folded to the outside. A preferred aspect of the invention also consists in protecting the sealing seam from dust during filling with the core material by using suitable means, such as for example a cover or an expediently positioned suction device.

After completion of the sealing operation the auxiliary contour can be removed or also remain at the vacuum insulation body. When it is removed, a multiple layer of the films solely is present in the interior of the vacuum insulation body in the final shape after applying the vacuum.

As explained above, one aspect of the invention provides that e.g. in the case of a rectangular opening of the film envelope or casing made of a film tube, the tube opening initially is reduced in size by tapering folding, which then again is unfolded up to the full tube cross-section. In the corner region of the film envelope or casing, a defined film folding selectively is made or a resulting wrinkling of the film is accepted.

In a preferred aspect of the invention it is provided that the casing and/or the cover film partly or completely are formed as high-barrier films.

It furthermore is conceivable that the casing and/or the cover film partly or completely are made of an aluminum compound foil.

In a further aspect of the invention it is provided that the vacuum-tight casing is present as bag. The bag can be formed round or angular in cross-section.

This bag can be open on one side, wherein the open side constitutes the opening for filling with the core material.

Furthermore, it is conceivable that the surface area of the casing is larger than the surface area of an enveloping body or an enveloping body portion against which the casing rests. This provides for correspondingly reproducing the contours of the enveloping body on the casing.

As explained above, it preferably is provided that the region of the casing folded to the outside has a flat, preferably horizontal surface, and this flat surface forms one of the two sealing surfaces for vacuum-tightly closing the opening. The other one of the surfaces is formed by a portion of the cover film.

In a further aspect of the invention it is provided that the opening of the casing, through which the core material is filled in, is arranged in a main surface of the vacuum insulation body. Main surface in accordance with the invention is understood to be a complete side of the vacuum insulation body. Preferably, the complete side is one of the two largest sides or surfaces of the vacuum insulation body. In a cabinet-type refrigerator or freezer, this for example can be the region around the appliance rear wall, i.e. the portion of the vacuum insulation body which faces the rear side of the appliance. In the case of a chest, this can be the chest bottom, i.e. the region of the vacuum insulation body which is directed towards the bottom of the chest refrigerator or freezer.

When it is a closure element, such as a door or a lid of a refrigerator and/or freezer, this can be its front or upper side, for example. In this case, the filling opening thus is formed by the side of the casing which points towards the front or upper side of the closure element.

As explained above, this opening is securely closed with a film patch, i.e. by a cover film, after filling with a core material.

The present invention furthermore relates to a method for manufacturing a vacuum insulation body according to the first or second embodiments or further embodiments where the casing and/or the cover film partly or completely is formed as high-barrier film; where the casing and/or the cover film partly or completely consists of an aluminum compound foil; where the casing is present as bag and/or that the surface area of the casing is larger than the surface area of an enveloping body or an enveloping body portion against which the casing rests; where the folded region folded to the outside has a flat surface; where an auxiliary structure is provided, around which the edge region of the casing is folded to the outside; and/or where the opening of the casing is arranged in a main surface of the vacuum insulation body.

It preferably is provided that the casing is folded inwards in the edge region protruding towards the opening, so that the opening is reduced in size and subsequently is again folded outwards, wherein the region folded outwards and a region of the cover film are vacuum-tightly connected with each other all around.

Preferably, it furthermore is provided that in the edge region protruding towards the opening the casing is provided with an auxiliary structure on which the edge region rests such that the edge region forms a flat surface, and wherein the edge region with its flat surface and a region of the cover film are vacuum-tightly connected with each other all around.

Preferably, it is provided that all welds which connect the two film parts, i.e. the film of the vacuum insulation body and of the cover film, lie in one plane.

Further preferred aspects of the method are represented in the second embodiment and further embodiments where the casing and/or the cover film partly or completely is formed as high-barrier film; where the casing and/or the cover film partly or completely consists of an aluminum compound foil; where the casing is present as bag and/or that the surface area of the casing is larger than the surface area of an enveloping body or an enveloping body portion against which the casing rests; where the folded region folded to the outside has a flat surface; where an auxiliary structure is provided, around which the edge region of the casing is folded to the outside; and/or where the opening of the casing is arranged in a main surface of the vacuum insulation body.

The present invention furthermore relates to a heat-insulated container, preferably a refrigerator and/or freezer with a tempered and preferably cooled interior space and with a wall at least partly surrounding the tempered and preferably cooled interior space, wherein between the tempered and preferably cooled interior space and the wall a vacuum insulation body according to any of the first, second, or further embodiments is located. This vacuum insulation body for example can be located between an outer wall of the body and the inner container or also between the outside and the inside of the door or of another closure element, such as for example of a lid of the appliance.

It should be noted that the terms "a" or "an" do not represent a limitation to exactly one corresponding component, but also comprise a plurality of the same. For example, several openings can be provided in the casing, several auxiliary contours, several cover films, several cooled interior spaces or exactly one of said elements. This correspondingly applies for all other components of the vacuum insulation body or of the heat-insulated container, preferably of the refrigerator and/or freezer.

The tempered interior space either is cooled or heated depending on the type of appliance (refrigerator, heating cabinet, etc.). Heat-insulated containers in the sense of the present invention include at least one tempered interior space, wherein the same can be cooled or heated, so that in the interior space a temperature below or above the ambient temperature of e.g. 21° C. is obtained. The invention hence is not limited to refrigerators and/or freezers, but generally relates to appliances with a tempered interior space, for example also heating cabinets or heating chests.

In one embodiment it is provided that the container according to the invention is a refrigerator and/or freezer, in particular a household appliance or a commercial refrigerator. For example, this comprises those appliances which are designed for a stationary arrangement in a household, in a hotel room, in a commercial kitchen or in a bar. For example, this can also be a wine refrigerator. Furthermore, chest refrigerators and/or freezers also are comprised by the invention. The appliances according to the invention can include an interface for connection to a power supply, in particular to a domestic mains supply (e.g. to a plug) and/or a standing or installation aid, such as for example adjustable feet, or an interface for fixation within a cabinet niche. For example, the appliance can be a built-in appliance or also a floor-mounted appliance.

Preferably the container or the appliance is formed such that it can be operated with an AC voltage, such as with a domestic voltage of e.g. 120 V and 60 Hz or 230 V and 50 Hz. In an alternative embodiment it is conceivable that the container or the appliance is formed such that it can be operated with direct current of a voltage of e.g. 5 V, 12 V or 24 V. In this aspect it can be provided that inside or outside the appliance a plug-in power supply unit is provided, via which the appliance is operated. An operation with DC voltage in particular can be employed when the container includes a thermoelectric heat pump for tempering the interior space.

In particular, it can be provided that the refrigerator and/or freezer has a cabinet-like design and includes a usable space which on its front side (in the case of a chest on the upper side) is accessible for a user. The usable space can be divided into several compartments, which all are operated at the same temperature or at different temperatures. Alternatively, merely one compartment can be provided. Within the usable space or a compartment storage aids such as for example storage compartments, drawers or bottle holders (in the case of a chest also space dividers) can be provided, in order to ensure an optimum storage of refrigerated or frozen goods and an optimum use of space.

The usable space can be closed by at least one door pivotable about a vertical axis. In the case of a chest a flap pivotable about a horizontal axis or a sliding cover is conceivable as closure element. In the closed condition, the door or another closure element can substantially air-tightly be connected with the body by means of a circumferential magnetic seal. Preferably, the door or another closure element also is heat-insulated, wherein the heat insulation can be achieved by means of a foam fill and possibly by means of vacuum insulation panels, or also preferably by means of a vacuum system and particularly preferably by means of a full vacuum system. On the inside of the door, door shelves possibly can be provided, so that refrigerated goods also can be stored there.

In one embodiment, this can be a small appliance. In such appliances the usable space, which is defined by the inner wall of the container, for example has a volume of less than 0.5 $m^3$, less than 0.4 $m^3$ or less than 0.3 $m^3$. The outside dimensions of the container or appliance preferably lie in the range of up to 1 m in terms of height, width and depth.

With respect to this container according to the invention the vacuum insulation body according to the invention preferably constitutes a full vacuum system, which is arranged in the space between the inner wall defining the interior space of the container or appliance and the outer skin of the container or appliance. A full vacuum system is understood to be a heat insulation which exclusively or chiefly consists of an evacuated region which is filled with a core material. The boundary of this region for example can be formed by a vacuum-tight film and preferably by a high-barrier film. Thus, between the inner wall of the container, preferably the appliance, and the outer skin of the container, preferably the appliance, such film body exclusively can be present as heat insulation, which includes a region surrounded by a vacuum-tight film, in which a vacuum exists and in which a core material is arranged. A foam fill and/or vacuum insulation panels as heat insulation or another heat insulation apart from the full vacuum system between the inside and the outside of the container or appliance preferably are not provided.

This preferred kind of heat insulation in the form of a full vacuum system can extend between the wall defining the interior space and the outer skin of the body and/or between the inside and the outside of the closure element, such as a door, flap, lid or the like.

The present invention relates to a vacuum insulation body with a core, preferably of a powder packing, whose film envelope consists of at least two parts, namely of the casing and of the cover film. As explained above, it is advantageous when after filling a portion of the casing is used as flat element for closing the filling opening. Preferably, it is provided that all welds which connect the two film parts, i.e. the casing on the one hand and the cover film on the other hand, lie in one plane.

The non-flat film part of the casing can be folded back, i.e. be folded to the inside, below the welding seam, and this backward fold can rest against the welding seam.

At the corners of the welded area, the casing of the non-flat film parts in the welding seam can repeatedly be folded over each other.

It turned out to be a problem in the manufacture of vacuum insulation bodies that a main obstacle is settling of the powder packings being used, such as e.g. pearlite. To obtain good insulation properties, such packings in principle must consist of fine-grained material. These packings tend to absorb air during transport, whereby the density of the packing is reduced.

When negative pressure is applied in the bulk material, the same is compressed to a high extent due to shrinkage, which represents great challenges to the surrounding high-density envelope.

According to a known method it is provided to fluidize the bulk material and fill it into the interspace of the double-walled contour container or vacuum insulation body. After each pumping operation, the air used for fluidizing must escape, which greatly increases the duration of the process.

Against this background, another object of the invention consists in providing a method with which fast filling of a vacuum insulation body can be achieved.

This object is solved by a method with the features of the method embodiment that is a method for filling a vacuum insulation body, in particular a vacuum insulation body according to any of the first, second, or further embodiments, with a powdery core material, in particular with pearlite, characterized in that filling is performed without the core material being fluidized. Accordingly, it is provided that filling of the vacuum insulation body is effected without fluidization of the powdery core material.

It was found out that filter pearlites, which by settlement or by mechanical compression are compacted to a certain density, i.e. to a density which is greater than that of a simple (non-settled) packing, can expediently be distributed in a 3-dimensional contour body or in a 3-dimensional vacuum insulation body also without fluidization.

Preferably, the required amount of core material for a vacuum insulation body is kept in stock in compressed form (by settlement or pressurization). Through an opening as large as possible, the powder kept in stock is filled into the insulation space, i.e. into the vacuum insulation body, wherein preferably as little air movement as possible takes place. In a vacuum insulation body as it is used in a housing of a refrigerator and/or freezer or in its door or other closure element, this preferably can be achieved in that a complete side of the insulation element or the vacuum insulation body is used for filling, in particular one of the two largest sides of the vacuum insulation body. In terms of manufacture, the appliance rear wall or the chest bottom of a chest refrigerator and/or freezer and the front panel of a door will be suitable for this purpose in a refrigerator and/or freezer.

The filling opening preferably constitutes the entire main surface or a large part of such main surface.

A preferred aspect of the invention provides that the method according to manufacturing a vacuum insulation body according to any of the first, second, or further embodiments and the method according to the method embodiment above are carried out. This means that in the manufacture of a vacuum insulation body both methods preferably are employed.

The filling opening, as described above, is vacuum-tightly closed with a film patch.

In a method according to the invention, the full vacuum system described above in detail can be obtained such that the casing is filled with the core material and subsequently vacuum-tightly sealed with the cover film. In one embodiment, both filling and vacuum-tight sealing of the casing is effected at normal or ambient pressure. The evacuation then is effected by connection of a suitable interface incorporated in the casing or the cover film, for example of an evacuation port which can include a valve, to a vacuum pump. During the evacuation, normal or ambient pressure preferably exists outside the casing. In this embodiment, it preferably is not required at any time of the manufacture to incorporate the insulation body into a vacuum chamber. In so far, a vacuum chamber can be omitted in one embodiment during the manufacture of the vacuum insulation body.

A vacuum-tight or diffusion-tight casing or a vacuum-tight or diffusion-tight connection or a high-barrier film preferably is understood to be a casing or a connection or a film by means of which the input of gas into the vacuum insulation body is reduced so much that the rise in the thermal conductivity of the vacuum insulation body due to the input of gas is low enough during its service life. Service life for example is understood to be a period of 15 years, preferably of 20 years, and particularly preferably of 30 years. Preferably, the rise in the thermal conductivity of the vacuum insulation body due to the input of gas during its service life is <100% and particularly preferably <50%.

Preferably, the area-specific gas permeation rate of the casing or the connection or the high-barrier film is $<10^{-5}$ mbar*l/s*m$^2$ and particularly preferably $<10^{-6}$ mbar*l/s*m$^2$ (as measured according to ASTM D-3985). This gas permeation rate applies for nitrogen and oxygen. For other types of gas (in particular steam) the gas permeation rates likewise are low, preferably in the range of $<10^{-2}$ mbar*l/s*m$^2$ and particularly preferably in the range of $<10^{-3}$ mbar*l/s*m$^2$ (as measured according to ASTM F-1249-90). Preferably, the aforementioned low rises in thermal conductivity are achieved by these low gas permeation rates.

An envelope system known from the field of vacuum panels are so-called high-barrier films. In accordance with the present invention, the same preferably are understood to be single- or multi-layer films (which preferably are sealable) with one or more barrier layers (typically metallic layers or oxide layers, wherein aluminum or an aluminum oxide preferably is used as metal or oxide), which satisfy the above-mentioned requirements (rise in thermal conductivity and/or area-specific gas permeation rate) as barrier against the input of gas.

The above-mentioned values or the structure of the high-barrier film are exemplary, preferred indications which do not limit the invention.

Figure 2:
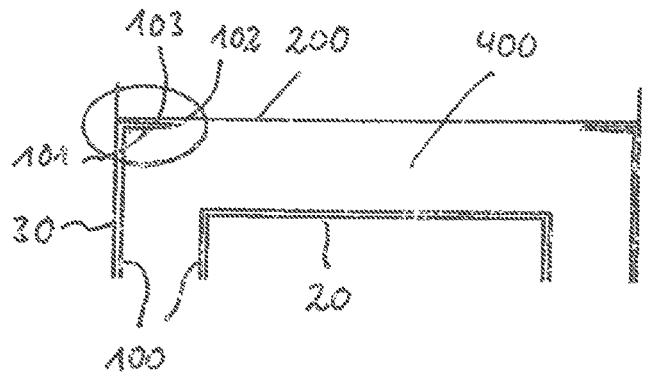

Further details and advantages of the invention will be explained in detail with reference to an exemplary embodiment illustrated in the drawing, in which:

FIG. 1: shows a schematic view of a vacuum insulation body with auxiliary contour adjoining an enveloping body, and FIG. 2: shows a schematic view of the arrangement according to FIG. 1 after the welding operation and after removal of the auxiliary contour.

FIG. 1 shows a refrigerator and/or freezer with reference numeral 10, for example a chest refrigerator and/or freezer, which includes a cooled interior space 12. In the representation of FIG. 1 the chest refrigerator and/or freezer is shown upside down, so that the open side of the inner container lies at the bottom.

The cooled interior space 12 is defined by an inner container 20, the outside of the chest by an outer shell 30. Between the two elements a cover frame 40 is located, which connects the inner container 20 and the outer shell 30 with each other. These elements together form an enveloping body whose interior space at least partly is filled by a vacuum insulation body.

The vacuum insulation body comprises a high-barrier film 100, which extends on the inside of the inner container, of the cover frame and of the outer shell, and which includes a filling opening 110 lying at the top according to FIG. 1.

The casing or the vacuum insulation body is formed as three-dimensional structure.

In the region of the filling opening 110 the high-barrier film is folded to the inside with the portion 101, so that a taper of the filling opening is obtained. This is adjoined by a connecting piece 102, which after being angled again connects the outwardly folded region 103 with the region 101.

The region 103 forms the outwardly folded region of the casing, which can be formed as film bag. In general, the edge region of the casing thus is formed by a structure U-shaped in cross-section, which consists of the portions 101, 102 and 103, wherein the portion 103 forms the end portion of the casing and is formed flat and preferably horizontal.

Reference numeral 200 designates a film patch, i.e. a cover film which likewise is formed flat and which is dimensioned such that it completely covers the opening 110. With its edge region the cover film 200 rests on the outwardly folded portions 103, namely circumferentially, so that after sealing a vacuum-tightly closed region is present within the vacuum insulation body.

As can be taken from FIG. 1, the U-shaped edge or end portion of the casing encloses an auxiliary structure 300, which results in said U-shaped structure of the end region of the casing 100.

It thus is possible that all welds which connect the two films, i.e. the casing 100 on the one hand and the cover film 200 on the other hand, lie in one plane. This ensures a reliable and safe manufacture of the sealing seam between the casing and the cover, which both can be designed as high-barrier film.

Thus, the auxiliary contour 300 quasi serves as counter welding frame during the sealing operation.

Reference numeral S designates the common sealing plane between the casing and the cover.

Reference numeral 400 designates the packing within the vacuum insulation body, which for example can be designed as pearlite.

In the exemplary embodiment shown here, the filling opening is the entire surface (lying at the top according to FIG. 1) of the vacuum insulation body, which faces the bottom side of the chest refrigerator or freezer. Thus, this is a main surface of the vacuum insulation body, through which the powder packing is drained into the insulation body, which results in a particularly easy filling operation. In principle, other surfaces of the vacuum insulation body also are suitable as filling opening, such as for example side faces or surfaces arranged on the back.

When the auxiliary contour is removed and vacuum is applied, the state shown in FIG. 2 is obtained. It can be seen here that the film folding of the casing in the sealing region consists of an inwardly folded region 101, the connecting region 102 and the outwardly folded region 103, wherein the latter is connected via the sealing seam and with the cover film, respectively. As shown in FIG. 2, the non-flat film part thus is folded back below the welding seam and this backward fold rests against the welding seam.

The invention claimed is:

1. A vacuum insulation body comprising a vacuum-tight casing which surrounds an evacuated region, wherein a core material is arranged in the evacuated region,
   characterized in
   that the casing includes an opening for filling the casing with the core material, which is covered by a vacuum-tight cover film, wherein the casing is folded inwards in the edge region protruding towards the opening, so that the opening is reduced in size, and subsequently again is folded outwards, wherein the region folded to the outside and a region of the cover film are vacuum-tightly connected with each other all around.

2. The vacuum insulation body according to claim 1, wherein in the edge region protruding towards the opening the casing is provided with an auxiliary structure on which the edge region rests such that the edge region forms a flat surface, and wherein the edge region with its flat surface and a region of the cover film are vacuum-tightly connected with each other all around.

3. The vacuum insulation body according to claim 1, characterized in that the casing and/or the cover film partly or completely is formed as high-barrier film.

4. The vacuum insulation body according to claim 1, characterized in that the casing and/or the cover film partly or completely consists of an aluminum compound foil.

5. The vacuum insulation body according to claim 1, characterized in that the casing is present as bag and/or that the surface area of the casing is larger than the surface area of an enveloping body or an enveloping body portion against which the casing rests.

6. The vacuum insulation body according to claim 1, characterized in that the folded region folded to the outside has a flat surface.

7. The vacuum insulation body according to claim 1, characterized in that an auxiliary structure is provided, around which the edge region of the casing is folded to the outside.

8. The vacuum insulation body according to claim 1, characterized in that the opening of the casing is arranged in a main surface of the vacuum insulation body.

9. A heat-insulated container comprising a tempered and cooled interior space, at least one wall at least partly surrounding the tempered and cooled interior space, and the vacuum insulation body according to claim 1 located between the tempered and cooled interior space and the at least one wall.

* * * * *